United States Patent [19]
Janis

[11] Patent Number: 5,263,157
[45] Date of Patent: Nov. 16, 1993

[54] METHOD AND SYSTEM FOR PROVIDING USER ACCESS CONTROL WITHIN A DISTRIBUTED DATA PROCESSING SYSTEM BY THE EXCHANGE OF ACCESS CONTROL PROFILES

[75] Inventor: Frederick L. Janis, Keller, Tex.

[73] Assignee: International Business Machines Corporation, Armonk, N.Y.

[21] Appl. No.: 480,437

[22] Filed: Feb. 15, 1990

[51] Int. Cl.$^5$ .............................................. G06F 15/40
[52] U.S. Cl. ................................. 395/600; 395/200; 395/275; 364/282.4; 364/974.7; 364/DIG. 1; 380/4; 380/25
[58] Field of Search ................... 364/DIG. 1, DIG. 2; 380/4, 25; 395/600, 200, 725

[56] References Cited

U.S. PATENT DOCUMENTS

| | | | |
|---|---|---|---|
| 4,145,739 | 3/1979 | Dunning et al. | 395/800 |
| 4,325,120 | 8/1982 | Colley et al. | 364/200 |
| 4,525,780 | 6/1985 | Bratt et al. | 395/425 |
| 4,543,638 | 9/1985 | Neches | 395/200 |
| 4,652,698 | 3/1987 | Hale et al. | 380/24 |
| 4,714,989 | 12/1987 | Billings | 395/700 |
| 4,718,005 | 1/1988 | Feizenbaum et al. | 364/200 |
| 4,924,378 | 5/1990 | Hershey et al. | 395/200 |
| 5,023,907 | 6/1991 | Johnson | 380/4 |
| 5,032,979 | 7/1991 | Hecht et al. | 395/575 |

*Primary Examiner*—Thomas C. Lee
*Assistant Examiner*—Paul R. Lintz
*Attorney, Agent, or Firm*—Andrew J. Dillon

[57] ABSTRACT

A method is disclosed for providing user access control for a plurality of resource objects within a distributed data processing system having a plurality of resource managers. A reference monitor service is established and a plurality of access control profiles are stored therein. Thereafter, selected access control profiles are exchanged between the reference monitor service and a resource manager in response to an attempted access of a particular resource object controlled by that resource manager. The resource manager may then control access to the resource object by utilizing the exchanged access control profile. In a preferred embodiment of the present invention, each access control profile may include access control information relating to a selected user; a selected resource object; a selected group of users; a selected set of resource objects; or, a predetermined set of resource objects and a selected group of users.

6 Claims, 4 Drawing Sheets

METHOD AND SYSTEM FOR PROVIDING USER ACCESS CONTROL WITHIN A DISTRIBUTED DATA PROCESSING SYSTEM BY THE EXCHANGE OF ACCESS CONTROL PROFILES

CROSS-REFERENCE TO RELATED APPLICATIONS

This application relates in general to U.S. patent application Ser. No. 07/480,440, filed of even date herewith entitled "METHOD FOR PROVIDING VARIABLE AUTHORITY LEVEL USER ACCESS CONTROL IN A DISTRIBUTED DATA PROCESSING SYSTEM," and U.S. patent application Ser. No. 07/480,442, filed of even date herewith, entitled "METHOD FOR PROVIDING USER ACCESS CONTROL WITHIN A DISTRIBUTED DATA PROCESSING SYSTEM," by the inventor hereof and assigned to the Assignee therein.

BACKGROUND OF THE INVENTION

1. Technical Field

The present invention relates to data processing systems in general and in particular to improved methods of providing access control for a plurality of resource objects within a distributed data processing system. Still more particularly, the present invention relates to a system which permits the rapid and efficient interchange of access control information throughout a distributed data processing system.

2. Description of the Related Art

Security and access control systems in computer based data processing systems are well known in the prior art. Existing access control systems are generally oriented to a single host system. Such single host access control systems are generally utilized to provide security for the host and access control to applications and system resources, such as files. Each application must generally provide access control for the resources controlled by that application.

One example of an access control system designed for utilization with the IBM 370 system is a product called RACF, or Resource Asset Control Facility. RACF offers access control for applications, such as files or CICS transactions and is hierarchically oriented in access authority levels and grouping of users. RACF is a "password" oriented access control system and access is granted or denied based upon a user's individual identity and his or her knowledge of an appropriate password to verify that identity. The RACF system is, however, oriented to a single host system and cannot be employed in a distributed data processing system which employs multiple hosts associated with separate groups of resource objects, due to the fact that this system does not allow the interchange of access control information from one host to another.

Another example of known access control systems is AS/400. The AS/400 system is a capability based system in which security is based upon each individual resource object. Each user is authorized to access individual resource objects based upon the user's capability within the system. The AS/400 system maintains security by keeping User Profiles, Object Authority, and System Values within the architecture of the machine itself. As above, this system is highly efficient at controlling access to resource objects controlled by a single host; however, access to resource objects located within a distributed data processing system containing multiple hosts cannot be controlled. That is, access to a resource object controlled by one host cannot be obtained by a user enrolled at a second host.

One other example of an access control system is the DB2 product. This product permits a more flexible access control and offers granular or bundled access control authority. For example, the DB2 system may utilize special authorities for administration or database operations. Further, access privilege may be bundled into a specified authority or role so that a user may access specific resource objects based upon the user's title or authority level, rather than the user's personal identity. However, as above, the DB2 system does not possess the capability of exchanging access control information with non-DB2 applications.

Therefore, it should be obvious that a need exists for a method of providing access control in a distributed data processing system whereby access to selected resource objects may be controlled throughout the distributed data processing system by means of the exchange of access control information throughout the system.

SUMMARY OF THE INVENTION

It is therefore one object of the present invention to provide an improved data processing system.

It is another object of the present invention to provide an improved method of providing access control for a plurality of resource objects within a distributed data processing system.

It is yet another object of the present invention to provide an improved method of providing access control for a plurality of resource objects within a distributed data processing system which permits the rapid and efficient interchange of access control information throughout a distributed data processing system.

The foregoing objects are achieved as is now described. The method of the present invention may be utilized to provide user access control for a plurality of resource objects within a distributed data processing system having a plurality of resource managers. A reference monitor service is established and a plurality of access control profiles are stored therein. Thereafter, selected access control profiles are exchanged between the reference monitor service and a resource manager in response to an attempted access of a particular resource object controlled by that resource manager. The resource manager may then control access to the resource object by utilizing the exchanged access control profile. In a preferred embodiment of the present invention, each access control profile may include access control information relating to a selected user; a selected resource object; a selected group of users; a selected set of resource objects; or, a predetermined set of resource objects and a selected list of users each authorized to access at least a portion of said predetermined set of resource objects.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
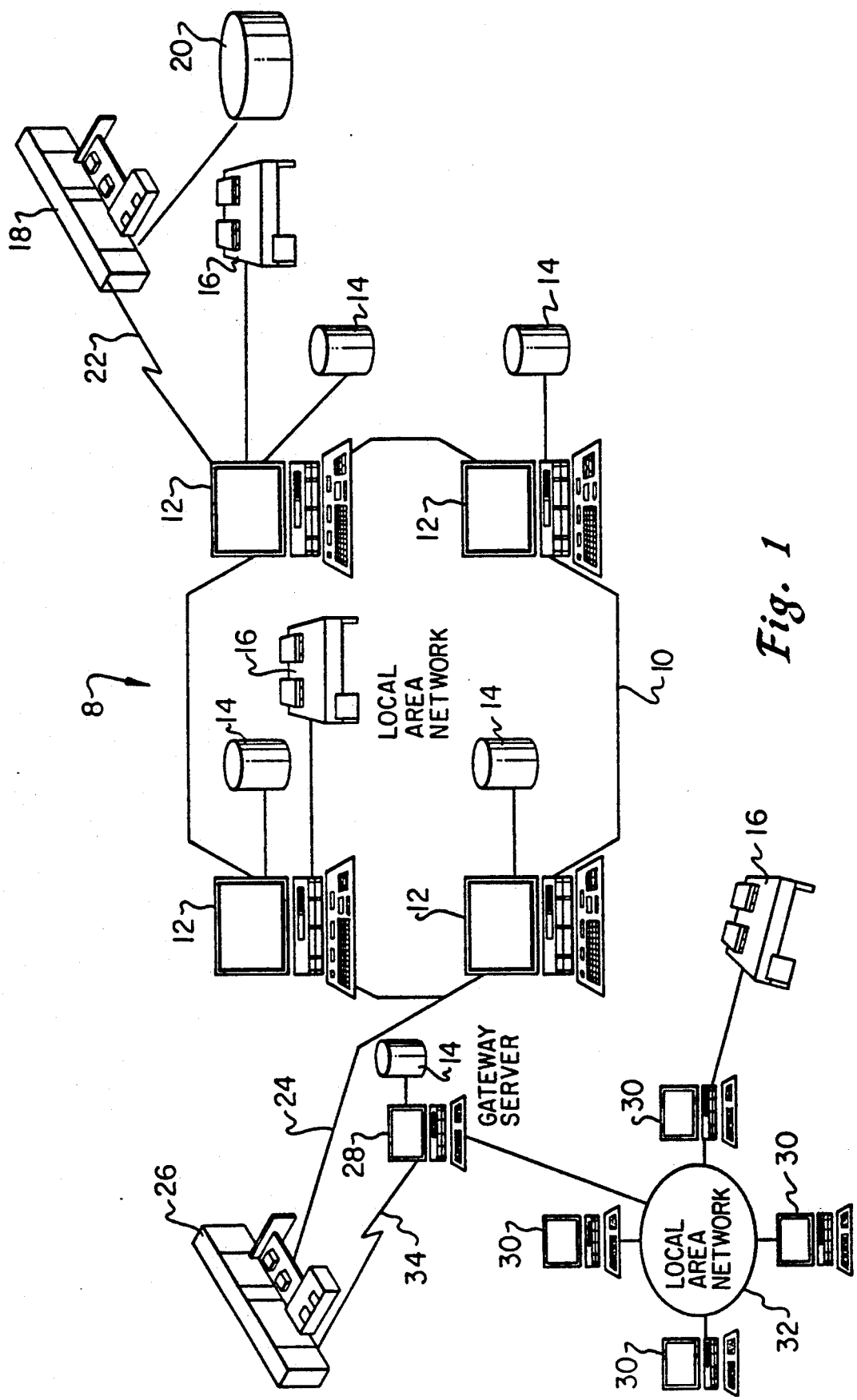
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or resource objects which may be periodically accessed by any user within data processing system 8. In a manner well known in the prior art, each such application or resource object stored within a storage device 14 is associated with a Resource Manager, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10 . Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, resource objects may be stored within storage device 20 and controlled by main frame computer 18, as resource manager for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type, should the user of an individual computer 30 desire to access a resource object stored within storage device 20, associated with main frame computer 18, it will be necessary for the user of computer 30 to be enrolled within the security system of main frame computer 18. This is necessary in order for the user of computer 30 to present the proper password to obtain access to the desired resource object. Of course, those skilled in the art will appreciate that this technique will prove ungainly in distributed data processing systems, such as data processing system 8 depicted within FIG. 1.

Figure 2:
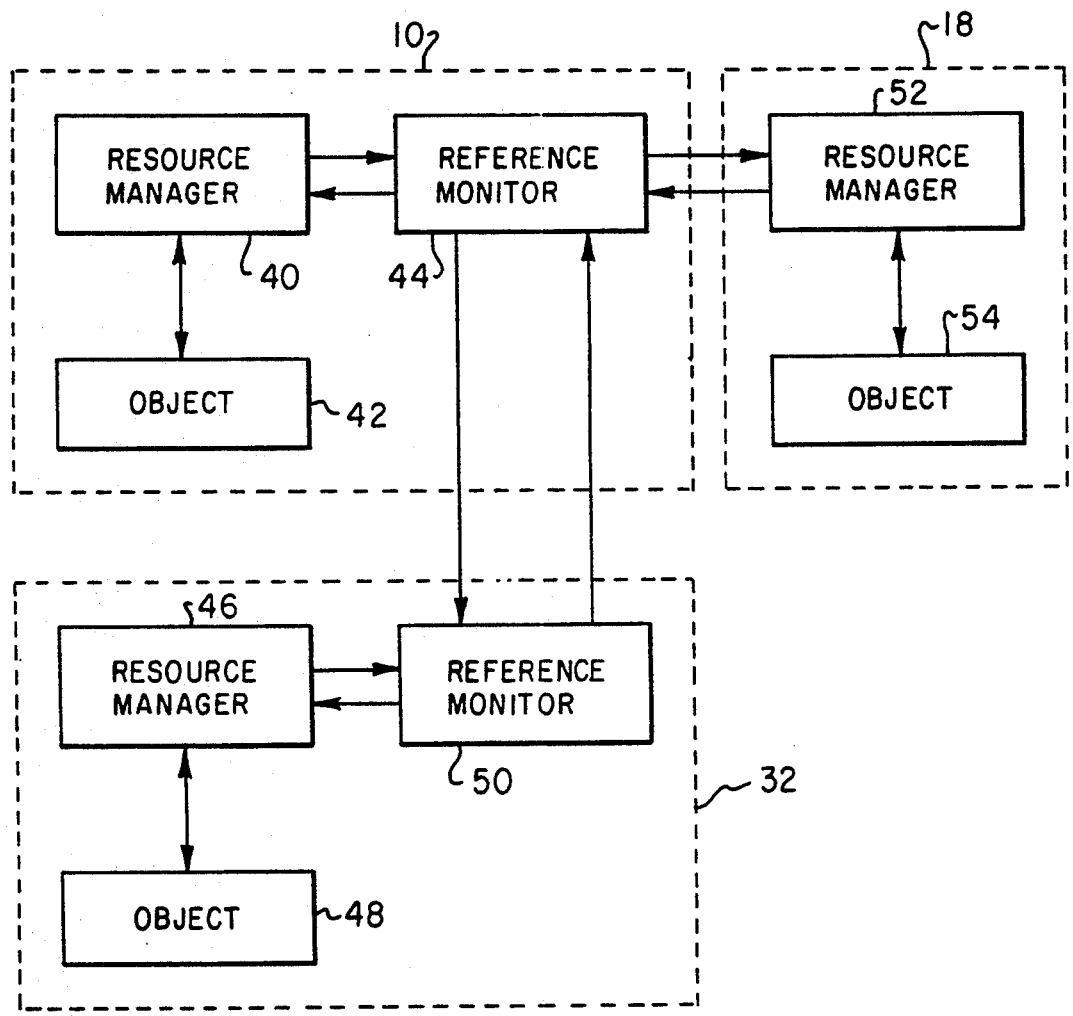
FIG. 2 depicts in block diagram form the access control system utilized with the method of the present invention.

Referring now to FIG. 2, there is depicted in block diagram form the access control system which is utilized with the method of the present invention. As is depicted, Local Area Networks (LAN) 10 and 32 are illustrated by dashed lines as is main frame computer 18. In each instance resource objects 42, 48 and 54 are illustrated in association with each portion of distributed data processing system 8 of FIG. 1. Of course, each object thus illustrated will be stored within one or more storage devices associated with each portion of data processing system 8. As is illustrated, Local Area Network 10 includes a resource manager 40 which may be one or more individual computers which are utilized to manage selected resource objects. Also established within Local Area Network 10 is a Reference Monitor 44. Reference Monitor 44, in accordance with the method of the present invention, is an application or service which is utilized to store access control profiles which may include access control information relating to: selected users; selected resource objects; a selected group of users; a selected set of resource objects; or, a predetermined set of resource objects and a selected list of users, each authorized to access at least a portion of said predetermined set of resource objects.

Still referring to FIG. 2, it may be seen that within Local Area Network (LAN) 33 a resource manager 46 is illustrated, which is utilized, in a manner well known in the art, to control access to resource object 48. Similarly, a Reference Monitor 50 is established within Local Area Network (LAN) 32. Reference Monitor 50 is, as described above, preferably utilized to store access control profiles relating to individual users within Local Area Network 32 as well as resource objects stored within Local Area Network 32.

Finally, main frame computer 18 is illustrated as including a resource manager 52 which has associated therewith one or more resource objects 54.

In accordance with an important feature of the present invention, any attempted access of a resource object, such as resource object 42, 48 or 54 will automatically result in a query by the associated resource manager to one or more Reference Monitor applications to determine whether or not the access requested will be permitted. It should be noted that, in accordance with the depicted embodiment of the present invention, only one Reference Monitor application is required for data processing system 8; however, two are illustrated. In accordance with the method of the present invention, communications links between a single Reference Monitor application may be established with each and every resource manager within data processing system 8 (see FIG. 1) so that access to selected resource objects may be controlled in accordance with the access control information stored within the profiles within that Reference Monitor.

In this manner, a user within Local Area Network (LAN) 32 may, via the communications links depicted within FIG. 1, request access to a resource object 54 associated with main frame computer 18. As will be explained in greater detail herein, resource manager 52 will then query Reference Monitor 44 and/or Reference Monitor 50 to determine whether or not a profile exists which permits the requested access. If so, the profile information is exchanged between the appropriate Reference Monitor and resource manager 52 and access to resource object 54 may be permitted.

Figure 3:
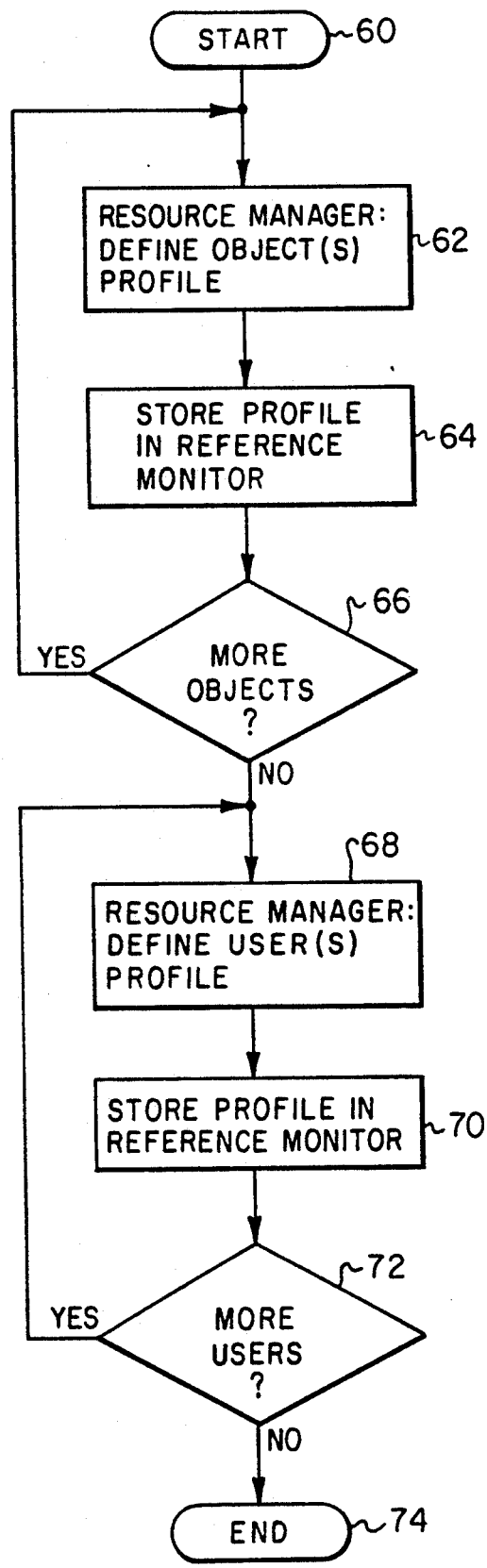
FIG. 3 is a high level flow chart depicting the establishment of an access control system in accordance with the method of the present invention.

With reference now to FIG. 3, there is depicted a high level flow chart illustrating the establishment of an access control system in accordance with the method of the present invention. As is illustrated, the process begins at block 60 and thereafter passes to block 62, which depicts the defining of an access control profile for an object or group of objects, by the associated resource manager. Thereafter, block 64 illustrates the storing of that profile within a Reference Monitor application. Next, block 66 illustrates a determination of whether or not additional objects require an access control profile to be established and if so, the process returns to block 62 and continues thereafter in an iterative fashion.

In the event no additional resource objects require access control profiles, the process passes to block 68 which illustrates the establishment by an associated resource manager of an access control profile for one or more users within the distributed data processing system. Thereafter, block 70 illustrates the storing of the access control profile thus created in an associated Reference Monitor application. Block 72 next determines whether not additional users within the data processing system require access control profiles to be created. If so, as above, the process returns to block 68 to define the additional profiles. In the event no additional users require access control profiles, then the process terminates, as illustrated in block 74. Of course, those skilled in the art will appreciate that in this manner it will be possible to create various access control profiles which contain access control information relating to a single resource object, a group of resource objects, an individual user, a group of users, or, a predetermined set of resource objects and a selected group of users.

Figure 4:
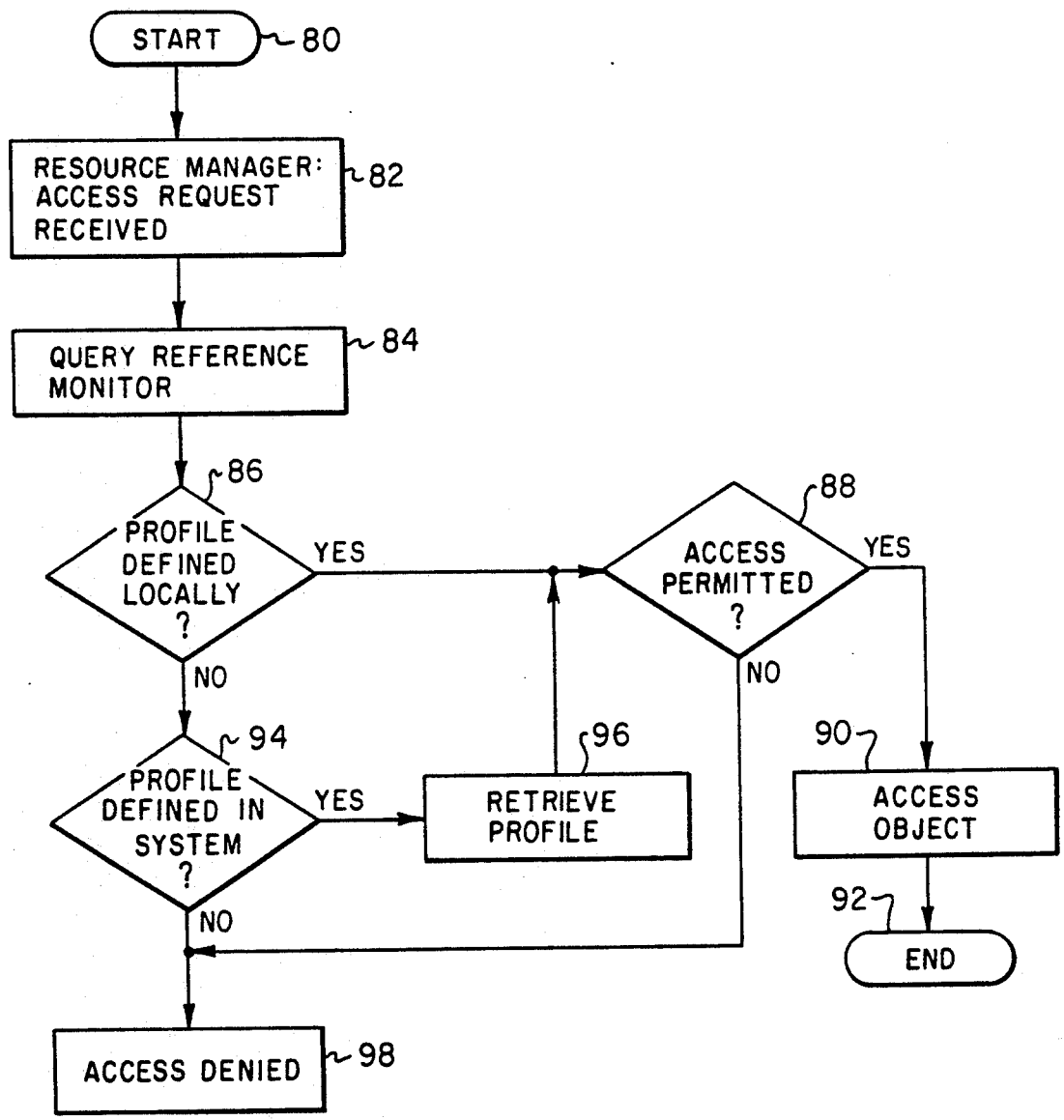
FIG. 4 is a high level flow chart depicting access to a resource object in accordance with the method of the present invention.

Finally, referring to FIG. 4, there is depicted a high level flow chart depicting access to a resource object in accordance with the method of the present invention. As is illustrated, the process begins at block 80 and thereafter passes to block 82 which illustrates the receipt by a resource manager of an access request for a resource object within that resource manager's purview. Next, the process passes to block 84 which illustrates the query of the nearest Reference Monitor application to determine whether or not an access control profile exists for the resource object or user in question.

Block 86 next depicts a determination of whether or not the appropriate access control profile is defined locally and if so, block 88 illustrates a determination of whether or not access to the specific resource object is permitted. This determination is, as those skilled in the art will appreciate, simply a matter of comparing the defined access control profile with the parameters of the resource object and the user in question. Thereafter, as illustrated in block 90, if the determination of block 88 so permits, access to the resource object is provided and the process terminates, as depicted in block 92.

Returning to block 86, in the event an access control profile is not defined locally, then block 94 illustrates a determination of whether or not an appropriate access control profile is defined anywhere within the system. If so, block 96 depicts the retrieval of that profile and the process then returns to block 88 for a determination of whether or not access to the selected resource object is permitted. Thereafter, if access is permitted, the process passes to block 90 which illustrates the accessing of the resource object and the subsequent termination of the process.

In the event the access control profile required is not defined anywhere within data processing system 8, (see FIG. 1) or access to the desired resource object is not permitted, as illustrated by the determination within block 88, then block 98 depicts the denial of access to the requested resource object with an appropriate message to the requester.

Upon reference to the foregoing, those skilled in the art will appreciate that by utilizing one or more Reference Monitor applications within a distributed data processing system, each containing one or more access control profiles relating to resource objects or users, it will be possible to control access to a plurality of resource objects located within various subsections of a distributed data processing system, without requiring each individual user within the distributed data processing system 8 to enroll with each resource manager located at every point within the system. By permitting the rapid and efficient interchange of access control profiles containing access control information throughout the system, necessary access control decisions are made at a limited number of locations and the process is greatly enhanced in terms of efficiency.

While the invention has been particularly shown and described with reference to a preferred embodiment, it will be understood by those skilled in the art that various changes in form and detail may be made therein without departing from the spirit and scope of the invention.

I claim:

1. A computer implemented method of providing user access control for a plurality of resource objects within a distributed data processing system having at least one reference monitor service and a plurality of resource managers associated with said plurality of resource objects, each of said plurality of resource managers controlling access to different selected ones of said resource objects, each of said resource managers associated with a reference monitor service, said method comprising the computer implemented steps of:

storing a plurality of unique access control profiles within each said reference monitor service, wherein selected ones of said plurality of access control profiles each include access control information relating to a predetermined set of said resource objects and a selected list of users each authorized to access at least a portion of said predetermined set of resource objects;

querying an associated reference monitor service by a selected one of said resource managers in response to an attempted access of a particular resource object among said plurality of resource objects, wherein access to said particular resource object is controlled by said selected resource manager;

transmitting a selected access control profile associated with said particular resource object from said associated reference monitor service to said selected one of said resource managers if said selected access control profile existed in said associated reference monitor service; if not, attempting to retrieve said selected access control profile from another said reference monitor service and thereafter transmitting said retrieved access control profile to said selected one of said resource managers; utilizing said selected resource manager to control access to said particular resource object in accordance with access control information in said selected access control profile; and denying access to said particular resource object in response to a failure to retrieve said selected access control profile.

2. The computer implemented method of providing user access control for a plurality of resource objects within a distributed data processing system according to claim 1 wherein selected ones of said plurality of access control profiles each include access control information relating to a selected group of users.

3. A computer implemented method of providing user access control for a plurality of resource objects within a distributed data processing system having a plurality of resource managers associated with said plurality of resource objects, each of said plurality of resource managers controlling access to different selected ones of said resource objects, said method comprising the steps of:

establishing at least one reference monitor service within said distributed data processing system;

associating each resource manager with a reference monitor service;

storing a plurality of unique access control profiles within each said reference monitor service, wherein selected ones of said plurality of access control profiles each include access control information relating to a predetermined set of said resource objects and a selected list of users each authorized to access at least a portion of said predetermined set of resource objects;

querying as associated reference monitor service by a selected one of said resource managers in response to an attempted access of a particular resource object among said plurality of resource objects, wherein access to said particular resource object is controlled by said selected resource manager;

transmitting a selected access control profile associated with said particular resource object from said associated reference monitor service to said selected one of said resource managers if said selected access control profile existed in said associated reference monitor service; if not, attempting to retrieve said selected access control profile from another said reference monitor service and thereafter transmitting said retrieved access control profile to said selected one of said resource managers; utilizing said selected resource manager to control access to said particular resource object in accordance with access control information in said selected access control profile; and denying access to said particular resource object in response to a failure to retrieve said selected access control profile.

4. The computer implemented method of providing user access control for a plurality of resource objects within a distributed data processing system according to claim 3, wherein selected ones of said plurality of access control profiles each include access control information relating to a selected group of users.

5. A data processing system for providing user access control for a plurality of resource objects within a distributed data processing system having at least one reference monitor service and a plurality of resource managers associated with said plurality of resource objects, each of said plurality of resource managers controlling access to different selected ones of said resource objects, each of said resource managers associated with a reference monitor service, said data processing system comprising:

means for storing a plurality of unique access control profiles within each said reference monitor service, wherein selected ones of said plurality of access control profiles each include access control information relating to a predetermined set of said resource objects and a selected list of users each authorized to access at lest a portion of said predetermined set of resource objects;

means for querying an associated reference monitor service by a selected one of said resource managers in response to an attempted access of a particular resource object among said plurality of resource objects, wherein access to said particular resource object is controlled by said selected resource manager;

means for transmitting a selected access control profile associated with said particular resource object from said associated reference monitor service to said selected one of said resource managers if said selected access control profile existed in said associated reference monitor service; and if not, for attempting to retrieve said selected access control profile from another said reference monitor service and thereafter transmitting said retrieved access control profile to said selected one of said resource managers;

means for utilizing said selected resource manager to control access to said particular resource object in accordance with access control information in said selected access control profile; and means for denying access to said particular resource object in response to a failure to retrieve said selected access control profile.

6. A data processing system for providing user access control for a plurality of resource objects within a distributed data processing system having a plurality of resource managers associated with said plurality of resource objects, each of said plurality of resource managers controlling access to different selected ones of said resource objects, said data processing system comprising:

means for establishing at least one reference monitor service within said distributed data processing system;

means for associating each resource manager with a reference monitor service;

means for storing a plurality of unique access control profiles within each said reference monitor service, wherein selected ones of said plurality of access control profiles each include access control information relating to a predetermined set of said resource objects and a selected list of users each authorized to access at least a portion of said predetermined set of resource objects;

mean for querying an associated reference monitor service by a selected one of said resource managers in response to an attempted access of a particular resource object among said plurality of resource objects, wherein access to said particular resource object is controlled by said selected resource manager;

means for transmitting a selected access control profile associated with said particular resource object from said associated reference monitor service to said selected one of said resource managers if said selected access control profile existed in said associated reference monitor service; if not, attempting to retrieve said selected access control profile from another said reference monitor service and thereafter transmitting said retrieved access control profile to said selected one of said resource managers;

means for utilizing said selected resource manager to control access to said particular resource object in accordance with access control information in said selected access control profile; and means for denying access to said particular resource object in response to a failure to retrieve said selected access control profile.

* * * * *